(12) United States Patent
Masuda

(10) Patent No.: US 9,013,459 B2
(45) Date of Patent: Apr. 21, 2015

(54) LIQUID CRYSTAL DISPLAY DEVICE

(75) Inventor: Yusuke Masuda, Osaka (JP)

(73) Assignee: Sharp Kabushiki Kaisha, Osaka (JP)

(*) Notice: Subject to any disclaimer, the term of this patent is extended or adjusted under 35 U.S.C. 154(b) by 23 days.

(21) Appl. No.: 13/978,489

(22) PCT Filed: Jan. 5, 2012

(86) PCT No.: PCT/JP2012/050096
§ 371 (c)(1),
(2), (4) Date: Jul. 5, 2013

(87) PCT Pub. No.: WO2012/093692
PCT Pub. Date: Jul. 12, 2012

(65) Prior Publication Data
US 2013/0285994 A1 Oct. 31, 2013

(30) Foreign Application Priority Data

Jan. 6, 2011 (JP) ................. 2011-001032

(51) Int. Cl.
G09G 5/14 (2006.01)
G02B 27/22 (2006.01)
G09G 3/00 (2006.01)
G09G 3/36 (2006.01)
H04N 13/04 (2006.01)

(52) U.S. Cl.
CPC .............. *G09G 5/14* (2013.01); *G02B 27/2264* (2013.01); *G09G 3/003* (2013.01); *G09G 3/3614* (2013.01); *G09G 3/3648* (2013.01); *H04N 13/0438* (2013.01); *H04N 13/0497* (2013.01)

(58) Field of Classification Search
CPC ..................................... H04N 13/0402–13/042
USPC .......................................................... 345/209
See application file for complete search history.

(56) References Cited

U.S. PATENT DOCUMENTS 7,932,884 B2 * 4/2011 Song et al. .................... 345/96
8,279,153 B2 * 10/2012 Song et al. .................... 345/94
2006/0119559 A1 * 6/2006 Jung et al. ...................... 345/96

FOREIGN PATENT DOCUMENTS

JP 2009-075392 A 4/2009

OTHER PUBLICATIONS

International Search Report corresponding to PCT/JP2012/050096, dated Mar. 13, 2012.

* cited by examiner

Primary Examiner — Latanya Bibbins
(74) Attorney, Agent, or Firm — Lowe Hauptman & Ham, LLP

(57) ABSTRACT

A liquid crystal display device includes: a display control unit configured to cause the liquid crystal panel to display a right eye image and a left eye image in an alternating manner; and a polarity control unit configured to cause the polarity of the drive voltage for the liquid crystal panel to be reversed. The polarity control unit causes the polarity of the drive voltage to be reversed such that, in one cycle including a number of display frames for right and left eye images, the number being a multiple of 8, the combination of polarities for image display in one pair of display frames composed of right and left eye images is one of four combinations and a number of occurrences of each of the four combinations is equal.

4 Claims, 8 Drawing Sheets

LIQUID CRYSTAL DISPLAY DEVICE

RELATED APPLICATIONS

The present application is a National Phase of International Application Number PCT/JP2012/050096, filed Jan. 5, 2012, and claims priority from Japanese Application Number 2011-001032, filed Jan. 6, 2011.

TECHNICAL FIELD

The present invention relates to liquid crystal display devices including a liquid crystal panel that is capable of displaying a right eye image and a left eye image in an alternating manner.

BACKGROUND ART

Liquid crystal display devices including a liquid crystal panel that is capable of displaying a right eye image and a left eye image in an alternating manner are known. In such a liquid crystal display device, as disclosed in JP 2009-75392 A, for example, polarity reversion may be performed, i.e. the polarity of the voltage applied to the liquid crystal of the liquid crystal display device may be reversed to prevent the polarity of the voltage applied to the liquid crystal from being the same continuously.

More specifically, the arrangement disclosed in JP 2009-75392 A prevents the voltage polarity from being the same continuously when right and left eye images are displayed by changing the polarity of the voltage applied to the liquid crystal at an interval of two frames composed of right and light eye images. This prevents image sticking in, and deterioration of, the liquid crystal caused by imbalances in the voltage applied to the liquid crystal in terms of polarity, for example.

DISCLOSURE OF THE INVENTION

In the arrangement disclosed in JP 2009-75392 A, the amount of change in the voltage necessary to achieve a prescribed voltage when the display is switched between a right eye image and a left eye image differs depending on whether the polarity of the voltage applied to the liquid crystal (i.e. the drive voltage) is changed or not. That is, switching between a right eye image and a left eye image while the polarity of the drive voltage remains the same does not require a large amount of change in the voltage. On the other hand, switching between a right eye image and a left eye image when the polarity of the drive voltage changes requires a larger amount of change in the voltage due to a polarity change.

Consequently, when the display is switched between a right eye image and a left eye image, the voltage actually applied to the liquid crystal varies depending on whether the polarity of the drive voltage remains the same or is reversed, resulting in variations in the response waveform of the liquid crystal. This may result in variations in the display quality of three-dimensional (3D) images.

The object of the present invention is to provide a liquid crystal display device including a display panel that is capable of displaying a right eye image and a left eye image in an alternating manner where the variation in the response waveform of the liquid crystal when the display is switched between a right eye image and a left eye image is reduced while preventing image sticking in the liquid crystal caused by imbalances in the drive voltage in terms of polarity.

A liquid crystal display device according to an embodiment of the present invention includes: a liquid crystal panel configured to display an image; a display control unit configured to cause the liquid crystal panel to display a right eye image to be viewed by a right eye of a viewer and a left eye image to be viewed by a left eye of the viewer in an alternating manner; and a polarity control unit configured to cause a polarity of a drive voltage for the liquid crystal panel to be reversed, wherein the polarity control unit causes the polarity of the drive voltage to be reversed such that, in one cycle including a number of display frames for right and left eye images, the number being a multiple of 8, a combination of polarities for image display in one pair of display frames composed of right and left eye images is one of four combinations and a number of occurrences of each of the four combinations is equal.

The liquid crystal display device according to one embodiment of the present invention reduces the variation in the response waveform of the liquid crystal when the display is switched between a right eye image and a left eye image while preventing image sticking in the liquid crystal caused by imbalances in the drive voltage in terms of polarity.

EMBODIMENTS FOR CARRYING OUT THE INVENTION

Figure 1:
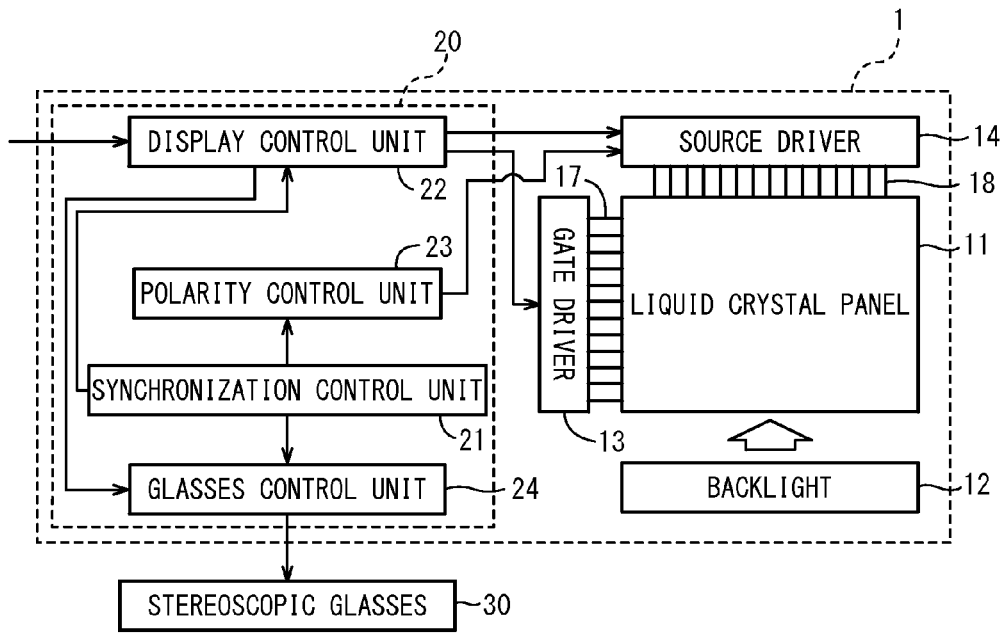
FIG. 1 is a block diagram schematically illustrating a liquid crystal display device according to an embodiment of the present invention.

A liquid crystal device according to one embodiment of the present invention includes: a liquid crystal panel configured to display an image; a display control unit configured to cause the liquid crystal panel to display a right eye image to be viewed by a right eye of a viewer and a left eye image to be viewed by a left eye of the viewer in an alternating manner; and a polarity control unit configured to cause a polarity of a drive voltage for the liquid crystal panel to be reversed, wherein the polarity control unit causes the polarity of the drive voltage to be reversed such that, in one cycle including a number of display frames for right and left eye images, the number being a multiple of 8, a combination of polarities for image display in one pair of display frames composed of right and left eye images is one of four combinations and a number of occurrences of each of the four combinations is equal (first arrangement).

In the above arrangement, in one cycle including a number of display frames for right and left eye images, the number being a multiple of 8, the combinations of drive voltage polarities, each in one pair of display frames composed of right and left eye images, include all the four possible combinations and the number of occurrences of each of the four combinations is equal. Thus, within one such cycle, the number of occurrences of the positive polarity of the drive voltage for right and left eye images is the same as that of the negative polarity, thereby preventing the drive voltage from being unbalanced toward one polarity.

Further, in the above arrangement, the number of occurrences of switching between a right eye image and a left eye image when the drive voltage polarity changes is substantially equal to the number of occurrences of switching between a right eye image and a left eye image while the drive voltage polarity remains the same. This will reduce the variation in the amount of change in the voltage caused by a change in the drive voltage polarity, thereby reducing the variation in the response waveform of the liquid crystal.

Thus, the above arrangement will improve the display quality of 3D images while preventing image sticking in the liquid crystal caused by imbalances in the drive voltage in terms of polarity, for example.

Typically, in a liquid crystal display device, a predetermined gray scale display is achieved by applying to the liquid crystal a voltage greater than the level required to drive the liquid crystal (i.e. an overshoot voltage). Accordingly, when there are variations in the amount of change in the voltage until the voltage reaches a prescribed value due to changes in the polarity of the drive voltage, the overshoot voltage must be changed as well, requiring memory space for storing the associated correction values. In contrast, the above arrangement reduces the variation in the amount of change in the voltage and thereby prevents an increase in the memory space.

Display frame as used herein means one left or right eye image. Consequently, when an identical right or left eye image is displayed a plurality of times, one such right or left eye image is one display frame.

In the first arrangement, it is preferable that the polarity control unit reverses the polarity of the drive voltage such that, in the one cycle, the number of occurrences of switching a display from a left eye image to a right eye image and the number of occurrences of switching the display from a right eye image to a left eye image remain the same whether the polarity of the drive voltage remains the same or changes (second arrangement).

This will reduce the variation in the amount of change in the voltage caused by changes in the drive voltage polarity, thereby reducing the variation in the response waveform of the liquid crystal. This will improve the display quality of 3D images.

In the first or second arrangement, it is preferable that the polarity control unit reverses the polarity of the drive voltage such that the one cycle includes eight consecutive display frames and that the combination of polarities for image display in the one pair of display frames is one of the four combinations on a one-to-one basis (third arrangement).

Thus, as the smallest number of display frames is provided, an arrangement will be achieved where imbalances in the drive voltage in terms of polarity are eliminated and the variation in the amount of change in the voltage caused by a change in the polarity is reduced. While larger numbers of display frames would make the signal more complicated when the polarity of the drive voltage is switched, providing the smallest number of display frames will prevent the signal from being complicated.

In any one of the first to third arrangements, it is preferable that each of the display frames includes two frames having an identical polarity and displaying an identical image (fourth arrangement).

Now, preferred embodiments of the liquid crystal display device of the present invention will be described with reference to the drawings. The dimensions of the components in the drawings do not exactly represent the dimensions of the actual components or the size ratios of the components.

(Overall Configuration)

FIG. 1 shows a block diagram schematically illustrating a liquid crystal display device 1 according to an embodiment of the present invention. The liquid crystal display device 1 includes a liquid crystal panel 11, backlight 12, gate driver 13, source driver 14 and control device 20. As detailed below, the liquid crystal display device 1 is configured to allow a viewer using stereoscopic glasses 30 to perceive 3D images. The liquid crystal display device 1 may be used as the display unit of, for example, a television, game machine, personal computer, personal digital assistant, or the like.

Although not shown, the liquid crystal panel 11 includes an active-matrix substrate, a counter substrate located opposite the active-matrix substrate, and a liquid crystal layer enclosed between these two substrates. The liquid crystal panel 11 may be a transmissive liquid crystal panel, for example, or a reflective or semireflective liquid crystal panel. That is, the liquid crystal panel 11 may be in any configuration as long as it is capable of displaying images.

Figure 2:
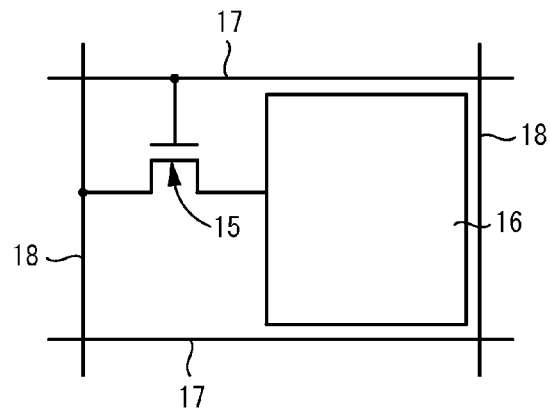
FIG. 2 schematically illustrates a portion of the active-matrix substrate.

As shown in FIG. 2, the active-matrix substrate includes a thin-film transistor 15 that serves as a switching device, a pixel electrode 16, and a plurality of gate lines 17 and a plurality of source lines 18 arranged as a grid to surround the transistor and pixel electrode.

As shown in FIG. 2, the thin-film transistor 15 on the active-matrix substrate has a gate electrode connected with a gate line 17. The thin-film transistor 15 has a source electrode connected with a source line 18. Further, the thin-film transistor 15 has a drain electrode connected with the pixel electrode 16.

Although not shown, the counter substrate is located opposite the active-matrix substrate at least at the pixel electrodes 16. The counter substrate includes a common electrode. A charge accumulating capacitance for accumulating a charge is formed by the common electrode, the pixel electrode 16 on the active-matrix substrate and the liquid crystal layer, not shown, located between the common and pixel electrodes.

As shown in FIG. 1, the gate lines 17 are connected with the gate driver 13. The gate driver 13 is configured to output a gate control signal provided by the display control unit 22, discussed below, to the gate lines 17 in the form of the gate voltage. The gate driver 13 outputs the gate voltage in response to a vertical synchronization signal provided by the display control unit 22. The one of the gate lines 17 provided with the gate voltage by the gate driver 13 transitions to a selected state.

As shown in FIG. 1, the source lines 18 are connected with the source driver 14. The source driver 14 generates a gray scale display signal necessary for the gray scale display of images based on image data provided by the display control unit 22. Further, the source driver 14 is configured to output the gray scale display signal to the source lines 18 in the form of the drive voltage. More specifically, the source driver 14 outputs a drive voltage corresponding to the one of the gate lines 17 that is selected by the gate driver 13. The source driver 14 outputs the drive voltage in response to a horizontal synchronization signal provided by the display control unit 22.

The source driver 14 is configured to set the polarity of the drive voltage based on a polarity control signal provided by the polarity control unit 23, as discussed below. More specifically, the source driver 14 is configured to output a drive voltage that is positive relative to the voltage of the common electrode, discussed below (hereinafter referred to as common voltage) and a drive voltage that is negative relative to the common voltage at a predetermined interval based on the polarity control signal. This prevents image sticking in the liquid crystal caused by a voltage of one polarity being continuously applied to the liquid crystal.

Although not shown, the backlight 12 is located adjacent one of the two sides of the liquid crystal panel 11 disposed in a thickness direction. The backlight 12 may be, for example, a direct backlight, an edge light or a flat surface light source. The light source for the backlight 12 may be a cold-cathode tube or a light-emitting diode, for example.

The control device 20 may include a synchronization control unit 21, display control unit 22, polarity control unit 23 and glasses control unit 24. Each of the synchronization control unit 21, display control unit 22, polarity control unit 23 and glasses control unit 24 may be implemented by an integrated circuit, for example. In implementations where the control unit 20 includes a central processing unit and memory, for example, the synchronization control unit 21, display control unit 22, polarity control unit 23 and glasses control unit 24 are implemented by the central processing unit reading a program stored in the memory and executing it.

The synchronization control unit 21 is configured to provide a synchronization reference signal to the display control unit 22, polarity control unit 23 and glasses control unit 24. The synchronization reference signal is a reference signal in response to which the polarity of the drive voltage provided by the source driver 14 to the source line 18 is reversed. In the present embodiment, the frequency of the synchronization reference signal is 240 Hz. The frequency of the synchronization reference signal is not limited to 240 Hz and may be 120 Hz, for example.

The display control unit 22 is configured to provide a vertical synchronization signal to the source driver 14 in response to the synchronization reference signal provided by the synchronization control unit 21. The vertical synchronization signal is used to drive the source driver 14.

The display control unit 22 is configured to generate image data of right eye images and image data of left eye images based on stereoscopic image data provided to the display control unit 22. The display control unit 22 is configured to provide the image data of stereoscopic images to the source driver 14 in response to the synchronization reference signal provided by the synchronization control unit 21.

In the present implementation, the display control unit 22 generates image data of right and left eye images; however, the present invention is not limited to such a configuration, and image data of right and left eye images may be input to the display control unit 22. In such implementations, the display control unit 22 outputs the input image data of right and left eye images to the source driver 14 without manipulating it.

The display control unit 22 is configured to provide a horizontal synchronization signal to the gate driver 13 in response to the synchronization reference signal provided by the synchronization control unit 21. The horizontal synchronization signal is used to drive the gate driver 13.

The display control unit 22 is configured to provide a gate control signal to the gate driver 13 in response to the synchronization reference signal provided by the synchronization control unit 21. The gate control signal turns the relevant thin-film transistor 15 on.

Further, the display control unit 22 is configured to provide a left-right identification signal to the glasses control unit 24 in response to the synchronization control signal provided by the synchronization control unit 21. The left-right identification signal indicates whether the liquid crystal panel 11 is displaying a right eye image or left eye image.

The polarity control unit 23 is configured to provide a polarity control signal to the source driver 14 in response to the synchronization reference signal provided by the synchronization control unit 21. The polarity control signal sets the polarity of the drive voltage. As discussed below, the polarity control unit 23 controls the polarity of the drive voltage in such a way that no image sticking occurs in the liquid crystal and the display quality of 3D images is improved.

The glasses control unit 24 is configured to control the light permeability of the stereoscopic glasses 30. Although not shown, the stereoscopic glasses 30 include a right eye liquid crystal shutter to be located forward of the right eye of the viewer when worn by the viewer, and a left eye liquid crystal shutter to be located forward of the left eye of the viewer. The liquid crystal shutters may be implemented using liquid crystal panels, for example.

The glasses control unit 24 is configured to control the opening/closing of the right and left eye liquid crystal shutters of the stereoscopic glasses 30 in response to the synchronization reference signal provided by the synchronization control unit 21.

The glasses control unit 24 is configured to control the opening/closing of the right and left eye liquid crystal shutters of the stereoscopic glasses 30 based on the left-right identification signal provided by the display control unit 22. More specifically, when in the liquid crystal panel 11 the display control unit 22 outputs a left-right identification signal indicating that a right eye image is being displayed, the glasses control unit 24 causes the right eye liquid crystal shutter of the stereoscopic glasses 30 to be opened (i.e. light can pass therethrough) and causes the left eye liquid crystal shutter to be closed (i.e. light cannot pass therethrough). On the other hand, when in the liquid crystal panel 11 the display control unit 22 outputs a left-right identification signal indicating that a left eye image is being displayed, the glasses control unit 24 causes the left eye liquid crystal shutter of the stereoscopic glasses 30 to be opened (i.e. light can pass therethrough) and causes the right eye liquid crystal shutter to be closed (i.e. light cannot pass therethrough).

In a liquid crystal display device 1 having the above-described configuration, the display control unit 22 drives the gate driver 13 and source drive 14 to cause the liquid crystal panel 11 to display a right eye image and a left eye image in an alternating manner. In the present embodiment, each right or left eye image is displayed for two frames. That is, for right and left eye images, the image of the first frame is the same as that of the second frame. In the description below, for ease of explanation, a time period during which an identical right or left eye image is displayed will be referred to as one display frame. That is, in the description below, one display frame means two frames where an identical image is displayed with the same drive voltage polarity.

(Switching of Drive Voltage Polarity)

In a liquid crystal display device 1 having the above-described configuration, different images taking the parallax of the two eyes into consideration are displayed as a right eye image and a left eye image such that a stereoscopic image can be perceived as the right eye views the right eye image and the left eye views the left eye image. Thus, when the display is switched between the right eye image and the left eye image, the gray scale level of the portions of the images that are changed due to the parallax varies.

In implementations using polarity reversion where the drive voltage polarity is reversed reciprocally for a right eye image and a left eye image, for example, one drive voltage polarity is always applied when right eye images are displayed while the other drive voltage polarity is always applied when left eye images are displayed. In such implementations, the portions of right and left eye images where the parallax produces different gray scale levels have imbalances in the drive voltage in terms of polarity, which may cause image sticking in the liquid crystal. Particularly, when a static image is displayed, right and left eye images with the same parallax are successively displayed in an extended period of time, increasing the likelihood of image sticking in the liquid crystal.

Figure 3:
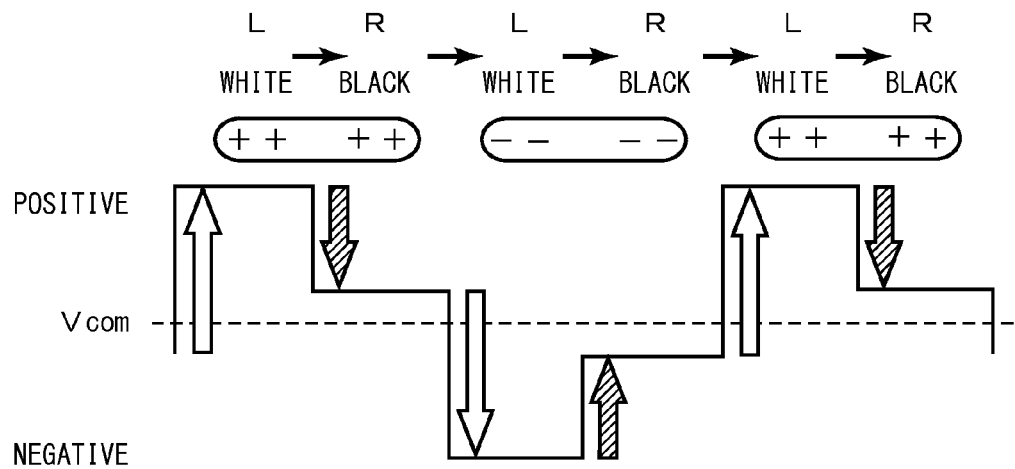
FIG. 3 illustrates an example of a pattern of changes in the drive voltage encountered when the polarity of the drive voltage is reversed at an interval of a pair of display frames composed of right and left eye images.
Figure 4:
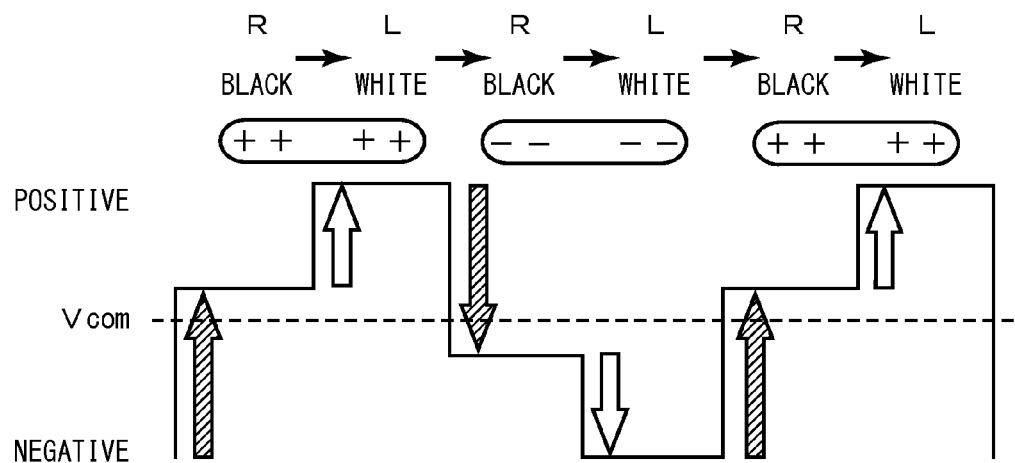
FIG. 4 illustrates another example of a pattern of changes in the drive voltage encountered when the polarity of the drive voltage is reversed at an interval of a pair of display frames composed of right and left eye images.

In view of this, as is the case with the above-described conventional techniques, the drive voltage polarity may be changed at an interval of a pair of display frames composed of right and left eye images to prevent the drive voltage polarity from being the same continuously when displaying right and left eye images. Examples of drive voltage patterns in such implementations are indicated by the solid lines in FIGS. 3 and 4. In the implementations of FIGS. 3 and 4, where left eye images (indicated by L) have a high gray scale level (for example, white in the example shown) and right eye images (indicated by R) have a low gray scale level (for example, black in the example shown), the drive voltage polarity ("++++" and "----" in the circles in the graphs) is changed at an interval of a pair of display frames for right and left eye images. That is, in the examples of FIGS. 3 and 4, the drive voltage polarity is changed such that the polarity for the two frames for right eye images is the same as that for the two frames for left eye images. FIGS. 3 and 4 are only different in each combination of a pair of display frames having a single drive voltage polarity. Further, while the present embodiment illustrates an implementation where right eye images have a high gray scale level and left eye images have a low gray scale level, the opposite may be the case. Furthermore, while in the present embodiment the images with a high gray scale level are white and the images with a low gray scale level are black, the images with a high gray scale level and those with a low gray scale level may be color images or intermediate color images.

In the implementation of FIG. 3, the amount of change in the voltage necessary at the transition from an image with a low gray scale level (i.e. a right eye image; hereinafter referred to as R) to an image with a high gray scale level (i.e. a left eye image; hereinafter referred to as L), indicated by a hollow arrow in the graph, is larger than the amount of change in the voltage necessary at the transition from an image with a high gray scale level (L) to an image with a low gray scale level (R), indicated by a hatched arrow in the graph. Thus, in the implementation of FIG. 3, the amount of change in the voltage necessary for a change in the gray scale level is unbalanced as it is larger at the transition from an image with a low gray scale level (R) to an image with a high gray scale level (L).

On the contrary, in the implementation of FIG. 4, the amount of change in the voltage necessary at the transition from an image with a high gray scale level (L) to an image with a low gray scale level (R), indicated by a hatched arrow in the graph, is larger than the amount of change in the voltage necessary at the transition from an image with a low gray scale level (R) to an image with a high gray scale level (L), indicated by a hollow arrow in the graph. Thus, in the implementation of FIG. 4, in contrast to that of FIG. 3, the amount of change in the voltage necessary for a change in the gray scale level is unbalanced as it is larger at the transition from an image with a high gray scale level (L) to an image with a low gray scale level (R).

Thus, the amount of change in the voltage necessary for switching between image gray scales significantly varies if each combination of a pair of display frames having a single drive voltage polarity is different.

Figure 5:
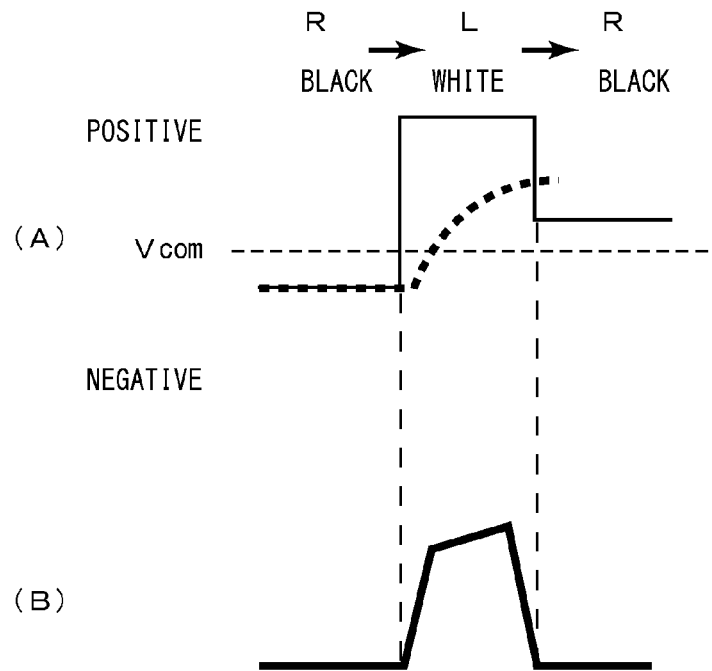
FIG. 5 illustrates (A) an enlarged graph of a portion of the example of a pattern of changes in the drive voltage shown in FIG. 3 and (B) a corresponding response waveform of the liquid crystal.
Figure 6:
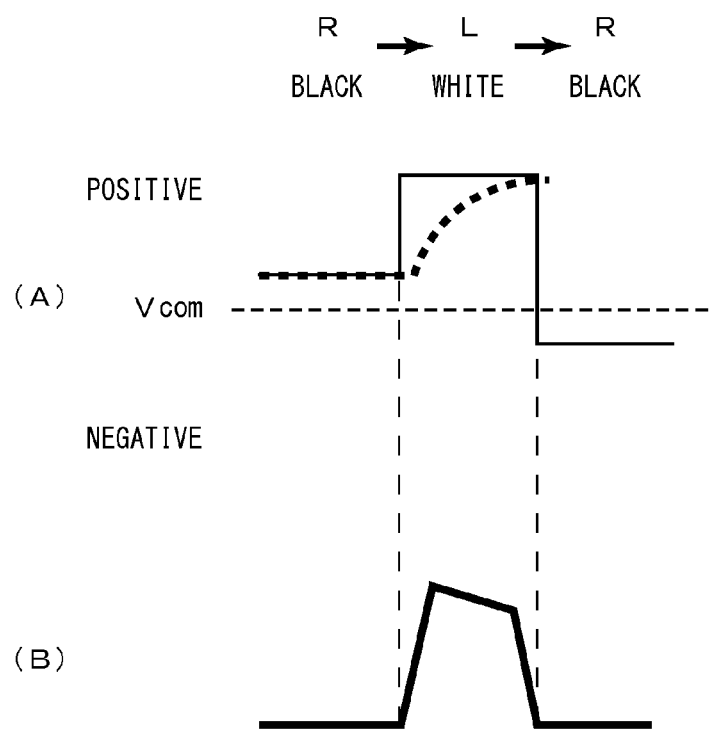
FIG. 6 illustrates (A) an enlarged graph of a portion of the example of a pattern of changes in the drive voltage shown in FIG. 4 and (B) a corresponding response waveform of the liquid crystal.

Next, FIG. 5 shows the necessary amount of change in the voltage at the transition from an image with a low gray scale level (R) to an image with a high gray scale level (L) according to FIG. 3 and a response waveform of the liquid crystal for the same time period. FIG. 6 shows the necessary amount of change in the voltage at the transition from an image with a low gray scale level (R) to an image with a high gray scale level (L) according to FIG. 4 and a response waveform of the liquid crystal for the same time period. In each of FIGS. 5 and 6, (A) shows a polarity control signal (indicated by the solid line) and an actual change in the voltage in the liquid crystal (indicated by the broken line), while (B) shows a response waveform of the liquid crystal for the same time period. In each of FIGS. 5(B) and 6(B), the vertical axis represents the brightness of images, for example.

It will be apparent from FIGS. 5 and 6 that a difference in each combination of a pair of display frames having a single drive voltage polarity results in a significant difference in the necessary amount of change in the voltage and also results in a difference in the voltage actually applied to the liquid crystal. That is, if there is a change in the drive voltage polarity at the transition from an image with a low gray scale level (R) to an image with a high gray scale level (L), as indicated by the solid line in FIG. 5(A), the necessary amount of change in the voltage is relatively large such that the voltage actually applied to the liquid crystal does not easily reach a prescribed level, as indicated by the thick broken line in FIG. 5(A). In contrast, if there is no change in the drive voltage polarity at the transition from an image with a low gray scale level (R) to an image with a high gray scale level (L), as indicated by the solid line in FIG. 6(A), the necessary amount of change in the voltage is relatively small such that the voltage actually applied to the liquid crystal quickly reaches a prescribed level, as indicated by the thick broken line in FIG. 6 (B).

Thus, if there is a change in each combination of a pair of display frames having a single drive voltage polarity, the necessary amount of change in the voltage varies significantly depending on whether the transition from an image with a low gray scale level (R) to an image with a high gray scale level (L) is accompanied by a change in the drive voltage polarity. Although not shown, the same applies to the transition from an image with a high gray scale level (L) to an image with a low gray scale level (R).

Consequently, in the implementations using polarity reversion shown in FIGS. 3 and 4, the response waveform of the liquid crystal at the transition from an image with a low gray scale level (R) to an image with a high gray scale level (L) is significantly different from the response waveform of the liquid crystal at the transition from an image with a high gray scale level (L) to an image with a low gray scale level (R), as shown in FIGS. 5(B) and 6(B). Thus, the response waveforms of the liquid crystal in these implementations do not have a rectangular but a distorted shape, as shown in FIGS. 5(B) and 6(B).

Figure 7:
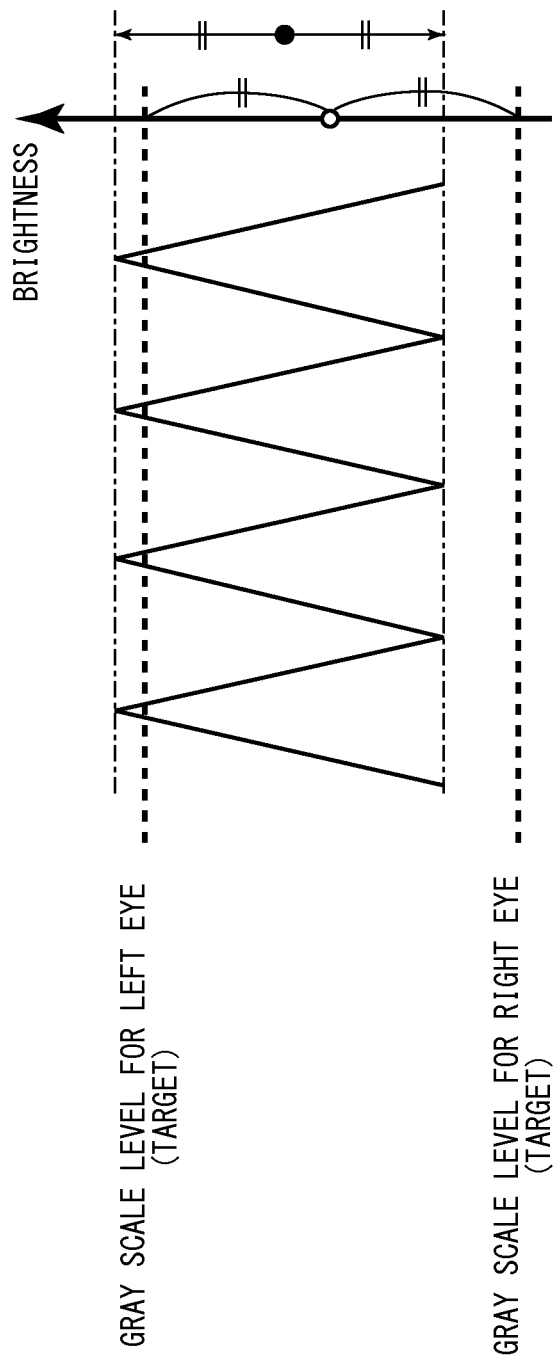
FIG. 7 illustrates a deviation in brightness encountered when the response waveform of the liquid crystal is distorted.

Such a distortion in the response waveform of the liquid crystal affects the brightness of the screen. That is, according to the drive voltage waveform shown in FIG. 4, for example, the amount of change in the voltage necessary at every transition from an image with a low gray scale level (R) to an image with a high gray scale level (L) is small, while the amount of change in the voltage necessary at every transition from an image with a high gray scale level (L) to an image with a low gray scale level (R) is relatively large. Consequently, as shown in FIG. 7, a target gray scale level is reached at transitions from an image with a low gray scale level (R) to an image with a high gray scale level (L), while a target gray scale level is not reached at transitions from an image with a high gray scale level (L) to an image with a low gray scale level (R). Thus, in the case of the waveform of the drive voltage shown in FIG. 4, the gray scale level that is actually perceived (indicated by the black circle in FIG. 7) is higher than the target gray scale level (indicated by the white circle in FIG. 7). That is, the screen actually appears brighter than targeted.

To mitigate such a distortion in the response waveform of the liquid crystal, the present embodiment provides a polarity control unit 23 configured in the following manner.

Figure 8:
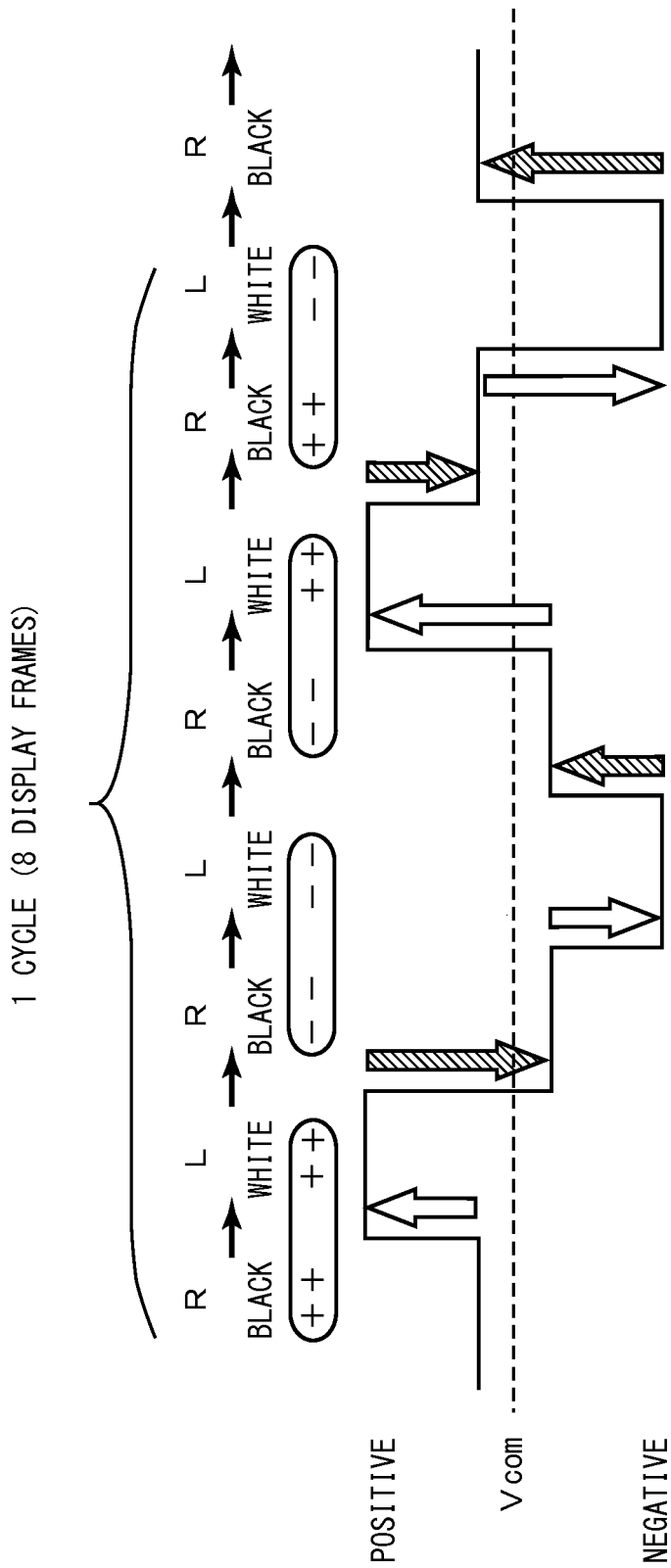
FIG. 8 illustrates an example of a pattern of changes in the drive voltage that uses all the four possible combinations of drive voltage polarities in one cycle.

First, the polarity control unit 23 is configured to change the combination of polarities of the drive voltage applied to the liquid crystal at an interval of a pair of display frames composed of right and left eye images (see FIG. 8). That is, the polarity control unit 23 is configured to change the combination of drive voltage polarities for displaying right and left eye images from a pair of display frames to the next pair of display frames. For example, the polarity control unit 23 controls the drive voltage polarity that, if the drive voltage polarity in a given display frame for a right eye image is positive and the drive voltage polarity in the following display frame for a left eye image is positive, then, in the next pair of display frames, the drive voltage polarity in the display frame for a right eye image is negative and the drive voltage polarity in the following display frame for a left eye images is negative.

Further, the polarity control unit 23 controls the drive voltage polarity such that one cycle of changes in the drive voltage polarity is composed of eight display frames, i.e. four consecutive pairs of display frames for right and left eye images (corresponding to 16 frames since each image is displayed twice if the frequency of the synchronization reference signal is 240 Hz, as in the present embodiment), and this cycle is repeated. Then, the polarity control unit 23 controls the drive voltage polarity such that, within one such cycle, the combinations of drive voltage polarities, each in a pair of display frames for right and left eye images, include all the four possible combinations of polarities. More specifically, there are four possible combinations of drive voltage polarities in one pair of display frames for right and left eye images, namely ++(positive and positive), −− (negative and negative), +− (positive and negative) and −+ (negative and positive) for right and left eye images. The positive control unit 23 controls the drive voltage polarity such that all these four polarity combinations are included in one cycle of changes in the polarity described above.

FIG. 8 shows an example of a cycle using all the four drive voltage polarity combinations. As shown in FIG. 8, using all the four drive voltage polarity combinations results in an equal number of the arrows of each type in one cycle. That is, in one cycle, out of the transitions from an image with a low gray scale level (R) to an image with a high gray scale level (L), those with a change in the drive voltage polarity (indicated by the longer hollow arrows in FIG. 8) and those without a change in the polarity (indicated by the shorter hollow arrows in FIG. 8) are in the same number. Similarly, in one cycle, out of the transitions from an image with a high gray scale level (L) to an image with a low gray scale level (R), those with a change in the drive voltage polarity (indicated by the longer hatched arrows in FIG. 8) and those without a change in the polarity (indicated by the shorter hatched arrows in FIG. 8) are in the same number. Further, in one cycle, out of the transitions from an image with a low gray scale level (R) to an image with a high gray scale level (L) and from an image with a high gray scale level (L) to an image with a low gray scale level (R), those with a change in the drive voltage polarity (indicated by the longer arrows in FIG. 8) and those without a change in the polarity (indicated by the shorter arrows in FIG. 8) are in the same number.

Thus, in one cycle, the amounts of change in the voltage at the transitions from an image with a low gray scale level (R) to an image with a high gray scale level (L) are evened up as a whole regardless of whether a transition is accompanied by a change in the drive voltage polarity or not, thereby evening up imbalances in the amount of change in the voltage. Similarly, the imbalances in the amount of change in the voltage at the transitions from an image with a high gray scale level (L) to an image with a low gray scale level (R) are evened up as a whole.

Figure 9:
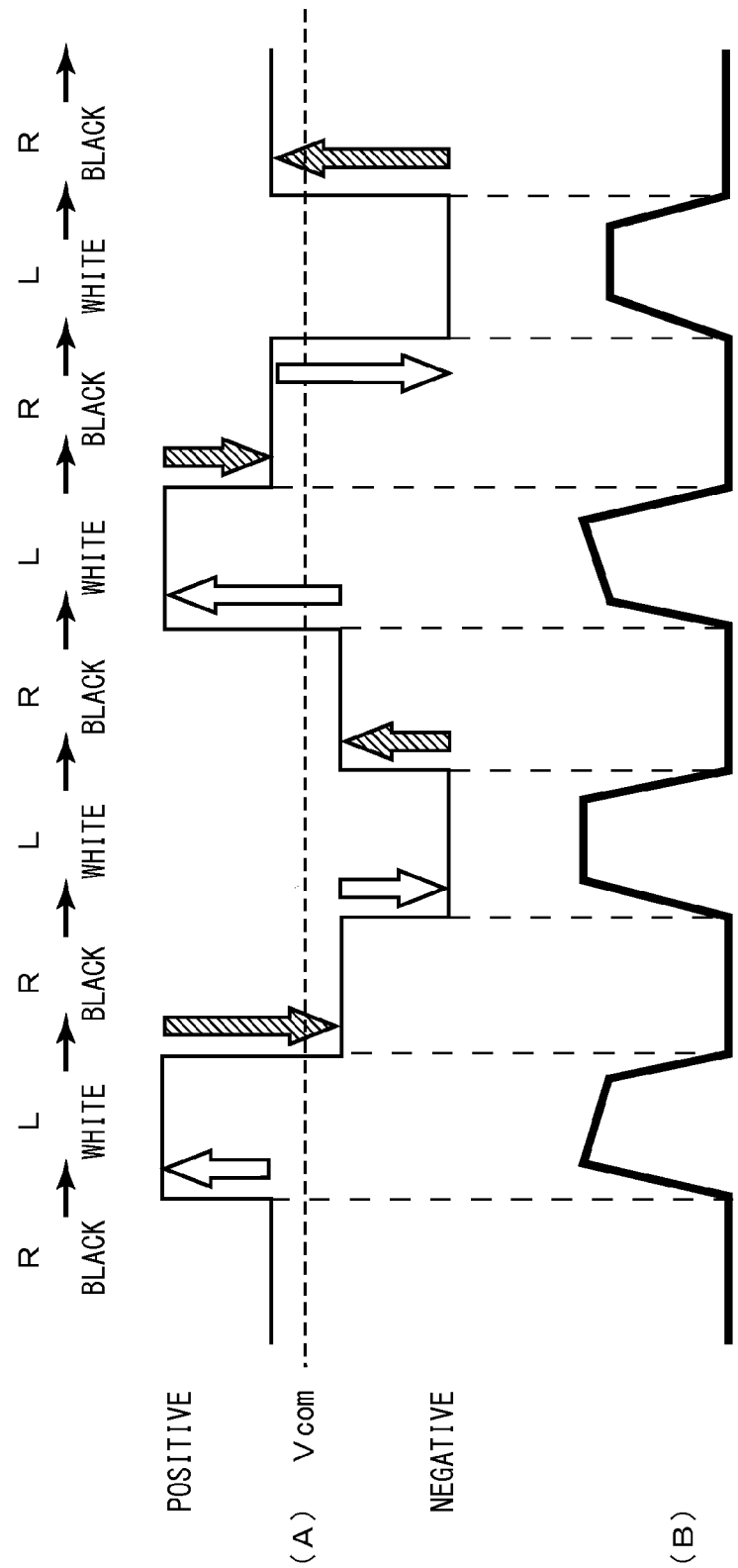
FIG. 9 illustrates (A) changes in the drive voltage in the example of a pattern of changes in the drive voltage shown in FIG. 8 and (B) a corresponding response waveform of the liquid crystal.

Thus, even though the response waveform of the liquid crystal is distorted microscopically at image changes, the distortion of the response waveform of the liquid crystal is evened up over one cycle at the transitions from an image with a low gray scale level (R) to an image with a high gray scale level (L) and the transitions from an image with a high gray scale level (L) to an image with a low gray scale level (R). More specifically, as shown in FIG. 9, the response waveform of the liquid crystal (FIG. 9(B)) for the changes in the drive voltage (FIG. 9(A)) within one cycle includes two types of trapezoids shown in FIGS. 5(B) and 6(B). Then, if this waveform is evened up over one cycle, the response change from an image with a low gray scale level (R) to an image with a high gray scale level (L), represented by the height in the waveform of FIG. 9(B), is equal to the response change from an image with a high gray scale level (L) to an image with a low gray scale level (R), represented by the height in the waveform of FIG. 9(B) in one cycle. Thus, the response waveform of the liquid crystal as viewed by the viewer has substantially no distortion.

Figure 10:
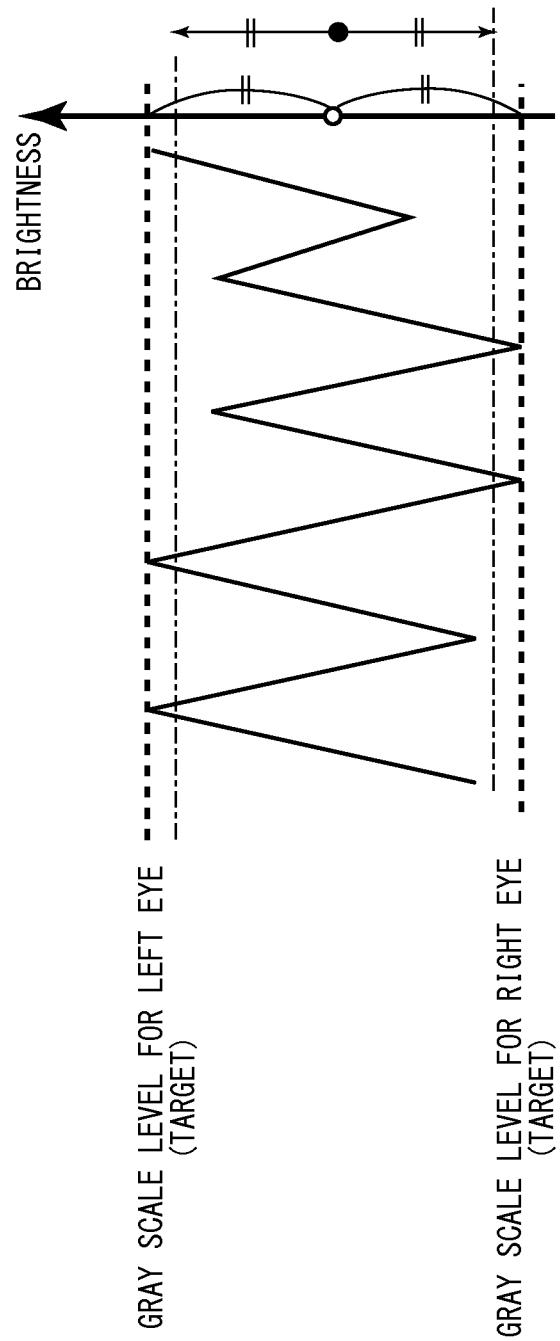
FIG. 10 illustrates how the deviation in brightness is reduced when the drive voltage is changed as shown in FIG. 8.

That is, as the drive voltage for the liquid crystal is provided in a pattern as shown in FIG. 8, the imbalances in the amount of change in the voltage at transitions from an image with a low gray scale level (R) to an image with a high gray scale level (L) are substantially equal to the imbalances in the amount of change in the voltage at transitions from an image with a high gray scale level (L) to an image with a low gray scale level (R). Thus, as shown in FIG. 10 as an example, the image gray scale level as it is perceived (indicated by the black circle in the graph), which depends on the average brightness of images with a high gray scale level (L), indicated by the upper one-dot chain line shown, and the average brightness of images with a low gray scale level (R), indicated by the lower one-dot chain line shown, is substantially equal to the targeted gray scale level (indicated by the white circle in the graph).

Thus, using all the four drive voltage polarity combinations in one cycle, as discussed above, rectifies the imbalances in the brightness, thereby improving the display quality of 3D images.

Moreover, the number of occurrences of each of the two polarities is equal for the right eye images and left eye images in one cycle, thereby preventing the drive voltage from being unbalanced toward one polarity. That is, the drive voltage may be prevented from being unbalanced toward one polarity when displaying right eye images, while the drive voltage may be prevented from being unbalanced toward the other polarity when displaying left eye images. Thus, the above arrangement will prevent image sticking in the liquid crystal.

Further, the above arrangement will prevent the drive voltage from being unbalanced in terms of polarity and reduce imbalances in the amount of change in the voltage necessary to change the gray scale level even when the images with a high gray scale level (L) and the images with a low gray scale level (R) in FIG. 8 are interchanged, for example. That is, even when the images with a high gray scale level and the images with a low gray scale level are interchanged, each combination of polarities is one of the four possible combinations in one cycle and the number of occurrences of each combination is the same, achieving the same advantages as in FIG. 8.

If one or more of the four drive voltage polarity combinations are not used in one cycle, the number of occurrences of each type of voltage change will not be equal, as discussed above (as in the implementations of FIGS. 3 and 4, for example) or, even if the number of occurrences of each type of voltage change is made equal, there will be imbalances in the voltage in terms of polarity (for example, if the polarities for four display frames are +++−). As such, an arrangement that prevents the drive voltage from being unbalanced in terms of polarity and evens up the imbalances in the amount of change in the voltage can only be achieved by using all the four polarity combinations, as in the present embodiment.

Figure 11:
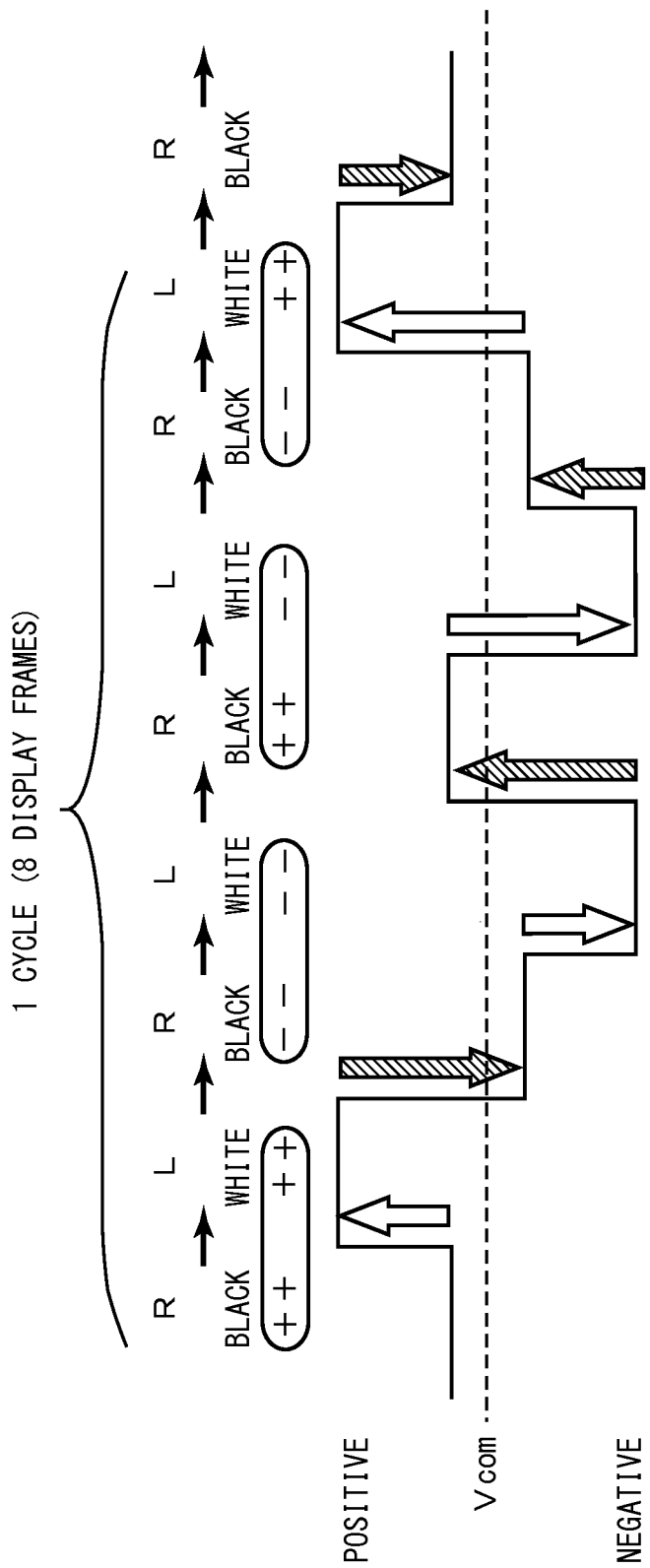
FIG. 11 illustrates another example where all the four possible combinations of drive voltage polarities are used in one cycle, similar to FIG. 8.

The drive voltage polarity combinations in one cycle are not limited to the above-described pattern of FIG. 8 as long as all the four polarity combinations are used. That is, the four polarity combinations may be in any order in one cycle. An exemplary pattern other than that of FIG. 8 is shown in FIG. 11.

Further, the above arrangement includes eight display frames in one cycle (i.e. four combinations of right and left eye images); however, four drive voltage polarity combinations may be used in any number of display frames that is a multiple of 8. In such implementations, the number of occurrences of each polarity combination must be equal in one cycle formed of a number of display frames that is a multiple of 8.

Effects of Embodiment

As described above, in the present embodiment, the polarity control unit 23 controls the drive voltage polarity such that the drive voltage polarity combination is changed at an interval of a pair of display frames for right and left eye images. The polarity control unit 23 controls the drive voltage polarity such that the drive voltage polarity combinations, each in one pair of display frames, include all the four polarity combinations in one cycle of changes in the polarity composed of eight display frames, i.e. four consecutive pairs of display frames.

This will prevent image sticking in the liquid crystal caused by imbalances in the drive voltage in terms of polarity and even up the distortion of the response waveform of the liquid crystal in one cycle composed of eight display frames. Thus, the arrangement of the present embodiment will prevent image sticking in the liquid crystal and improve the display quality of 3D images.

Moreover, as one cycle of changes in the drive voltage polarity includes eight display frames, the operational load of controlling the drive voltage polarity will be minimized.

Typically, the imbalances in the response waveform of the liquid crystal may be rectified by applying a voltage that is larger than the voltage necessary to drive the liquid crystal (i.e. an overshoot voltage). With this method, if there are variations in the amount of change in the voltage accompanying changes in the drive voltage polarity, the correction voltages for these variations must be stored in a memory or the like in the form of data, requiring more memory space. In contrast, the arrangement of the present embodiment will even up the variations in the amount of change in the voltage, eliminating the necessity to store data of correction voltages for the variations in the amount of change in the voltage and thereby preventing an increase in memory space.

Other Embodiments

Although an embodiment of the present invention has been described, the above embodiment is merely an example that may be used to carry out the present invention. Thus, the present invention is not limited to the above embodiment and the above embodiment may be modified as necessary without departing from the spirit of the invention.

In the above embodiment, the stereoscopic glasses 30 are used to allow the viewer to perceive right and left eye images, displayed in an alternating manner, as 3D images. However, any arrangement for allowing the viewer to perceive right and left eye images displayed in an alternating manner as 3D images may be employed.

In the above embodiment, the liquid crystal display device 1 displays two frames for an identical right eye image and two frames for an identical left eye image. However, the liquid crystal display device 1 may display one frame for a right eye image and one frame for a left eye image. In such implementations, each frame for a right or left eye image constitutes a display frame.

INDUSTRIAL APPLICABILITY

The display device according to the present invention is useful as a display device including a display panel that is capable of displaying a right eye image and a left eye image in an alternating manner.

The invention claimed is:

1. A liquid crystal device comprising:
a liquid crystal panel configured to display an image;
a display control unit configured to cause the liquid crystal panel to display a right eye image to be viewed by a right eye of a viewer and a left eye image to be viewed by a left eye of the viewer in an alternating manner; and
a polarity control unit configured to cause a polarity of a drive voltage for the liquid crystal panel to be reversed, wherein the polarity control unit causes the polarity of the drive voltage to be reversed such that, in one cycle including a number of display frames for right and left eye images, the number being a multiple of 8, a combination of polarities for image display in one pair of display frames composed of right and left eye images is one of four combinations and a number of occurrences of each of the four combinations is equal.

2. The liquid crystal display device according to claim 1, wherein the polarity control unit reverses the polarity of the drive voltage such that, in the one cycle, the number of occurrences of switching a display from a left eye image to a right eye image and the number of occurrences of switching the display from a right eye image to a left eye image remain the same whether the polarity of the drive voltage remains the same or changes.

3. The liquid crystal display device according to claim 1, wherein the polarity control unit reverses the polarity of the drive voltage such that the one cycle includes eight consecutive display frames and that the combination of polarities for image display in the one pair of display frames is one of the four combinations on a one-to-one basis.

4. The liquid crystal display device according to claim 1, wherein each of the display frames includes two frames having an identical polarity and displaying an identical image.

* * * * *